Sept. 13, 1927.    F. BALCERZAK    1,642,396
COMBINED CAP REMOVER AND MILK BOTTLE TOP
Filed March 4, 1926
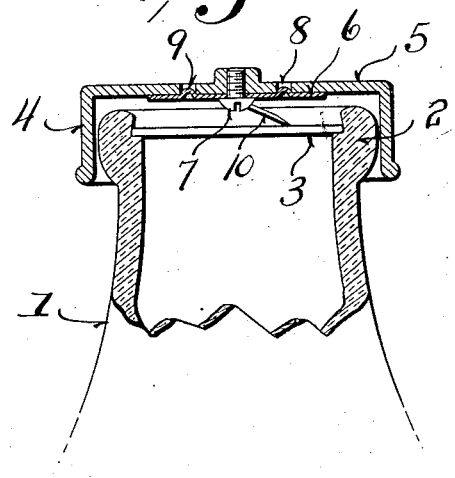
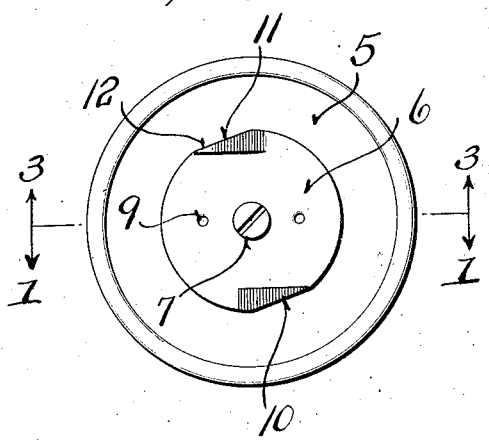   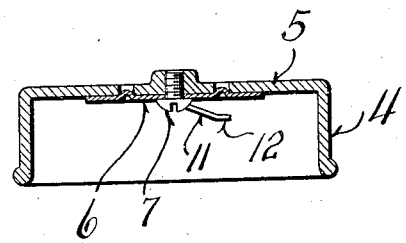
Inventor:
Frank Balcerzak
By
Attorneys Patented Sept. 13, 1927.

1,642,396

UNITED STATES PATENT OFFICE.

FRANK BALCERZAK, OF MILWAUKEE, WISCONSIN.

COMBINED CAP REMOVER AND MILK-BOTTLE TOP.

Application filed March 4, 1926. Serial No. 92,249.

This invention relates to combined cap remover and milk bottle top.

Objects of this invention are to provide a device which is adapted to remove milk bottle tops, such as the paper disk type, and which may, thereafter, be used as a milk bottle top or cover.

Further objects are to provide a combined milk bottle cover and cap remover which is so constructed that it may be placed over the closed bottle and slightly rotated to engage the cap and to so construct it that it may be tilted to remove the cap by first drawing upwardly at one edge thereof and thereafter completely removing the cap. Thus excessive stresses which would result from a direct upward motion of the device are avoided and also splashing of the milk during the removal of the cap is wholly avoided.

Further objects are to provide a device in which the parts may be readily separated for cleaning to maintain the apparatus in a highly sanitary condition.

An embodiment of the invention is shown in the accompanying drawings, in which:—

Figure 1 is a view of the upper end of a milk bottle with the device in place, such view being partly in section and corresponding to a section on the line 1—1 of Figure 2.

Figure 2 is a view from the under side of the device.

Figure 3 is a sectional view on the line 3—3 of Figure 2.

Referring to the drawings, it will be seen that a conventional form of milk bottle 1 has been shown which is provided with a neck portion 2 within the shouldered portion of which a disk-like paper cap 3 is positioned.

The device comprises a cylindrical shell 4 having a transverse top portion 5. Within this device, a disk or plate 6 is secured in a detachable manner, as by means of the screw 7. The top 5 is provided with a plurality of apertures 8 within which upwardly struck portions 9 of the plate 6 are positioned to hold the plate against rotation. Preferably, the lower edge of the cylindrical portion 4 of the device is provided with an ornamental bead, or otherwise finished to secure an attractive and pleasing appearance, and to provide a device free from sharp corners or outwardly extending projections.

It is to be noted particularly from reference to Figure 2, that the plate 6 is provided with a pair of tongues 10 and 11 cut therefrom and bent downwardly from the body of the plate. The tongue 10 is pointed, as indicated most clearly in Figure 1, and the tongue 11 has a flattened portion 12, as shown most clearly in Figure 3.

In using the device, it is merely necessary to place it upon the top of the closed bottle and to slightly rotate it while pressing downwardly. The pointed end of the tongue 10 digs into the paper cap 3, whereas, the flat portion 12 of the tongue 11 rides over such cap and grooves it or merely bears against the cap. Thus, after this slight rotation, one tongue has penetrated the cap and the other rests upon the opposite sides thereof. It is merely necessary to tilt the device so that the tongue 10 will lift one edge of the cap upwardly from the edge of the bottle while the other edge is held from slipping by means of the tongue 11. Thus, a very ready detaching of the cap may be secured without any danger of slipping or directly pulling the cap upwardly from the bottle, which latter procedure would necessarily cause splashing and probably would cause either tearing of the cap or detachment thereof from the removing apparatus.

After the cap has been removed it may be replaced, if desired, by repositioning the device over the mouth of the bottle and reversely rotating it while pressing it downwardly. However, as is the usual case, the paper cap is detached from the tongue 10 and thrown away. The device may be replaced upon the milk bottle to serve as a temporary cover therefor.

It is to be noted also that the plate 6 is readily detachable from the body of the device as in cleaning so that the device may be maintained in a highly sanitary condition.

It will be seen that a novel form of milk bottle cap remover has been provided which is of simple construction, which is easily operated, and which may be subsequently used as a temporary cover for the bottle.

Although the invention has been described in considerable detail, such description is intended as illustrative rather than limiting as the invention may be variously embodied and as the scope of such invention is to be determined as claimed.

I claim:

1. A combined milk bottle cap remover and bottle cover comprising a cylindrical member adapted to surround the upper end of a bottle and having a pair of downwardly slanting prongs, one of said prongs being adapted to enter the cap of the bottle upon rotation of the device, and the other of said prongs being adapted to ride upon the upper side of the cap.

2. A combined milk bottle cap remover and bottle cover comprising a cylindrical member having side walls adapted to surround the neck of a bottle and having a flat body portion, a plate secured to the under side of said body portion and having a pair of oppositely directed downwardly slanting tongues struck therefrom, one of said tongues being sharpened and adapted to enter the cap upon rotation of the device, and the other of said tongues having a flattened portion adapted to ride upon the upper side of the cap.

3. A combined milk bottle cap remover and bottle cover comprising a cylindrical member having side walls adapted to surround the neck of a bottle and having a flat body portion, a plate detachably secured to the under side of said body portion and having a pair of oppositely directed downwardly slanting tongues struck therefrom, one of said tongues being sharpened and adapted to enter the cap upon rotation of the device, and the other of said tongues having a flattened portion adapted to ride upon the upper side of the cap, said plate and said body portion having interengaging portions to prevent relative rotation of said plate.

4. A combined milk bottle top and cap remover, a circular plate having a cylindrical downwardly extending flange, an auxiliary plate positioned below said circular plate, a screw passing through said auxiliary plate and threaded into said circular plate for binding said auxiliary plate removably to said circular plate, said circular plate and said auxiliary plate having interengaging portions to prevent relative rotation, said auxiliary plate having two diametrically opposed tongues, one of said tongues being pointed and adapted to project into a bottle cap, and the other of said tongues having a flattened portion adapted to ride upon the top of the bottle cap, whereby said bottle cap may be removed in a tilting manner from the bottle.

In testimony that I claim the foregoing I have hereunto set my hand at Milwaukee, in the county of Milwaukee and State of Wisconsin.

FRANK BALCERZAK.